(12) United States Patent
Offer et al.

(10) Patent No.: US 8,271,887 B2
(45) Date of Patent: Sep. 18, 2012

(54) SYSTEMS AND METHODS FOR WHITEBOARD COLLABORATION AND ANNOTATION

(75) Inventors: Brad W. Offer, Seattle, WA (US); Russell W. White, Seattle, WA (US)

(73) Assignee: The Boeing Company, Chicago, IL (US)

( * ) Notice: Subject to any disclaimer, the term of this patent is extended or adjusted under 35 U.S.C. 154(b) by 744 days.

(21) Appl. No.: 12/175,105

(22) Filed: Jul. 17, 2008

(65) Prior Publication Data

US 2010/0017727 A1    Jan. 21, 2010

(51) Int. Cl.
G06F 3/00 (2006.01)
G06F 3/14 (2006.01)
G06F 15/16 (2006.01)

(52) U.S. Cl. ........ 715/753; 715/765; 715/733; 715/230; 709/204; 709/217

(58) Field of Classification Search .................. 715/733, 715/751, 753, 760, 764, 765, 781, 205, 230, 715/234; 709/201, 204, 213, 216–219
See application file for complete search history.

(56) References Cited

U.S. PATENT DOCUMENTS

| | | | |
|---|---|---|---|
| 5,506,999 A | 4/1996 | Skillman et al. | |
| 5,790,114 A * | 8/1998 | Geaghan et al. | 715/763 |
| 6,105,055 A | 8/2000 | Pizano et al. | |
| 6,144,991 A * | 11/2000 | England | 709/205 |
| 6,728,784 B1 | 4/2004 | Mattaway | |
| 6,964,022 B2 * | 11/2005 | Snowdon et al. | 715/759 |
| 7,024,456 B1 | 4/2006 | Simonoff | |
| 7,043,529 B1 | 5/2006 | Simonoff | |
| 7,152,093 B2 | 12/2006 | Ludwig et al. | |
| 7,206,809 B2 * | 4/2007 | Ludwig et al. | 709/204 |
| 7,219,127 B2 | 5/2007 | Huck et al. | |
| 2002/0087592 A1 * | 7/2002 | Ghani | 707/500 |
| 2003/0105818 A1 * | 6/2003 | Lapstun et al. | 709/204 |
| 2004/0070616 A1 * | 4/2004 | Hildebrandt et al. | 345/764 |
| 2005/0273700 A1 * | 12/2005 | Champion et al. | 715/512 |
| 2007/0146646 A1 * | 6/2007 | Rodriguez, Jr. | 353/69 |
| 2007/0198744 A1 | 8/2007 | Wensley et al. | |
| 2007/0214423 A1 * | 9/2007 | Teplov et al. | 715/751 |
| 2008/0005237 A1 | 1/2008 | Borys et al. | |
| 2008/0259030 A1 * | 10/2008 | Holtzman et al. | 345/158 |
| 2009/0187817 A1 * | 7/2009 | Ivashin et al. | 715/230 |
| 2011/0083109 A1 * | 4/2011 | Hildebrandt et al. | 715/862 |

* cited by examiner

*Primary Examiner* — Xiomar L Bautista
(74) *Attorney, Agent, or Firm* — Armstrong Teasdale, LLP

(57) ABSTRACT

A method for conducting a collaborative web-based whiteboard session, including receiving one or more whiteboard annotations in first units in a first client application component, converting the one or more whiteboard annotations from the first units into second units by utilizing a software component associated with the first client application component, sending the one or more whiteboard annotations, in the second units, to a second client application component, converting the one or more whiteboard annotations received from the first client application component from the second units into coordinates specific to the second client application component, and presenting the one or more whiteboard annotations using the coordinates specific to the second client application component to a user through the second client application component.

17 Claims, 4 Drawing Sheets

SYSTEMS AND METHODS FOR WHITEBOARD COLLABORATION AND ANNOTATION

BACKGROUND OF THE INVENTION

The present disclosure relates generally to communications of whiteboard content between two or more users at respective computers of a computer network, and more specifically to systems and methods for whiteboard collaboration and annotation where each user can annotate and/or update the content presented to all users in real-time.

Real-time whiteboard collaboration systems are useful for sharing information among multiple collaborators or participants, without requiring them to be physically co-located. However, existing systems have notable deficiencies. One stand-alone whiteboard collaboration system requires a user to work entirely within a specific whiteboard application. Therefore, there is no interaction with different computer applications, and annotations that are created within a specific whiteboard application can not be effectively communicated to different computer applications.

Other whiteboard collaboration systems, such as a screen capture system or a transparent window system, make it difficult to prevent a whiteboard program from inhibiting a user's interaction with an underlying application because the whiteboard program is required to have an operating system's focus during annotations. Further, screen areas available for annotations in the screen capture system and the transparent window system are constrained to that of a tool window. Therefore, underlying client applications must be made to fit under the whiteboard program as opposed to the other way around. Furthermore, annotations made in the screen capture system and the transparent window system are drawn on top of any content within client windows, possibly obscuring other information that may be of high interest. In addition, the screen capture system and the transparent window system require that each user set up and carefully maintain each window for underlying applications in a same position and size as well as ensure that contents of each window are identical. In addition to the above disadvantages, the screen capture system also requires a large amount of network bandwidth to be used for transmitting a screen capture image file at a high rate.

Further whiteboard collaboration systems, such as a custom collaboration system, are limited to a particular application that is being used. For example, a custom geographical information tool may communicate annotations with other instances of that specific custom geographical information tool, but could not communicate the annotations with any other type of geographical information tool.

BRIEF DESCRIPTION

Described herein are systems and methods that allow a user to create and draw annotations of various types and characteristics into an independent client application and transmit the annotations throughout a network and allowing the annotations to be displayed in other independent client applications.

In embodiments, described is a method for conducting a collaborative web-based whiteboard session, including receiving one or more whiteboard annotations in first units in a first client application component, converting the one or more whiteboard annotations received from the first client application component from the first units into second units by utilizing a software component associated with the first client application component, sending the one or more whiteboard annotations, in the second units, to a second client application component, converting the one or more whiteboard annotations received from the first client application component from the second units into coordinates specific to the second client application component, and presenting the one or more whiteboard annotations using the coordinates specific to the second client application component to a user through the second client application component.

In further embodiments, described is a system for conducting a collaborative web-based whiteboard session, the system including a first computer capable of communicating to other computes on a network. The first computer including a first user interface and a first client application component running thereon. The first client application component operable to receive one or more annotations via the first user interface, wherein the one or more annotations are in first units, and wherein the first client application component is operable to convert the one or more annotations into second units, and a first whiteboard application component associated with the first client application component. A second client application component, the first whiteboard application component operable to send the one or more converted annotations to the second client application component. The second client application operable to convert the one or more annotations received, from the second units into coordinates specific to the second application component. The second client application component operable to present the one or more whiteboard annotations using the coordinates specific to the second client application component to a user through the second client application component.

BRIEF DESCRIPTION OF THE DRAWINGS

The present disclosure is described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

Figure 1:
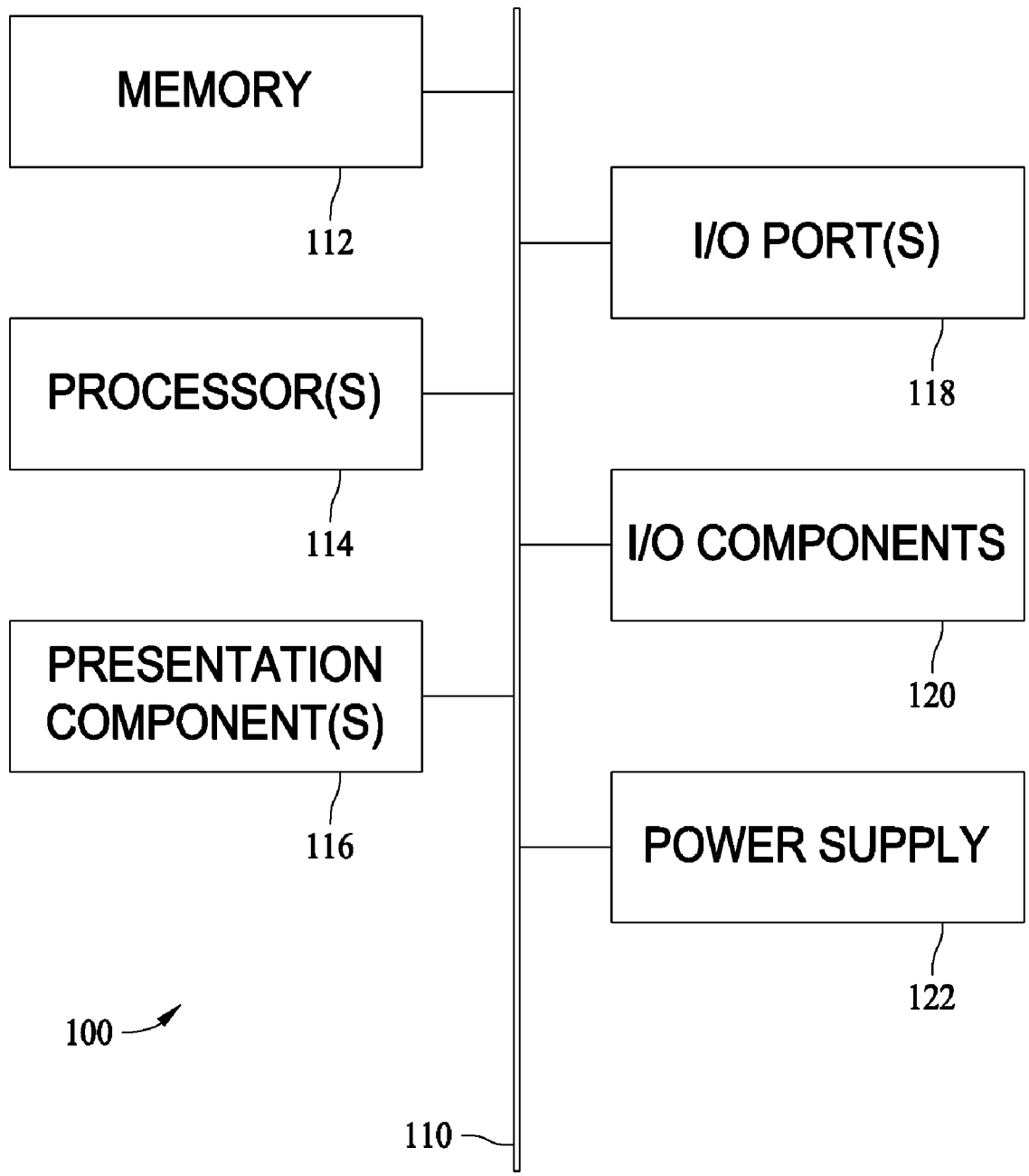
FIG. 1 is a block diagram illustrating an exemplary operating environment suitable for use in implementing embodiments of the present disclosure.

Referring initially to FIG. 1, an exemplary operating environment is shown and designated generally as computing device 100. Computing device 100 is but one example of a suitable computing environment and is not intended to suggest any limitation as to the scope of use or functionality of the present disclosure. Neither should the computing-environment 100 be interpreted as having any dependency or requirement relating to any one or combination of components illustrated herein.

The present disclosure may be described in a general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The present disclosure may be practiced in a variety of system configurations, including hand-held devices, consumer electronics, general-purpose computers, more specialty computing devices, and the like. The present disclosure may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, certain processors include onboard memory. It is recognized that such is the nature of the art, and reiterate that the diagram of FIG. 1 is merely illustrative of an exemplary computing device that can be used in connection with one or more embodiments of the present disclosure. Distinction is not made between such categories as "workstation," "server," "laptop," "hand-held device," and the like, as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, and the like.

Figure 2:
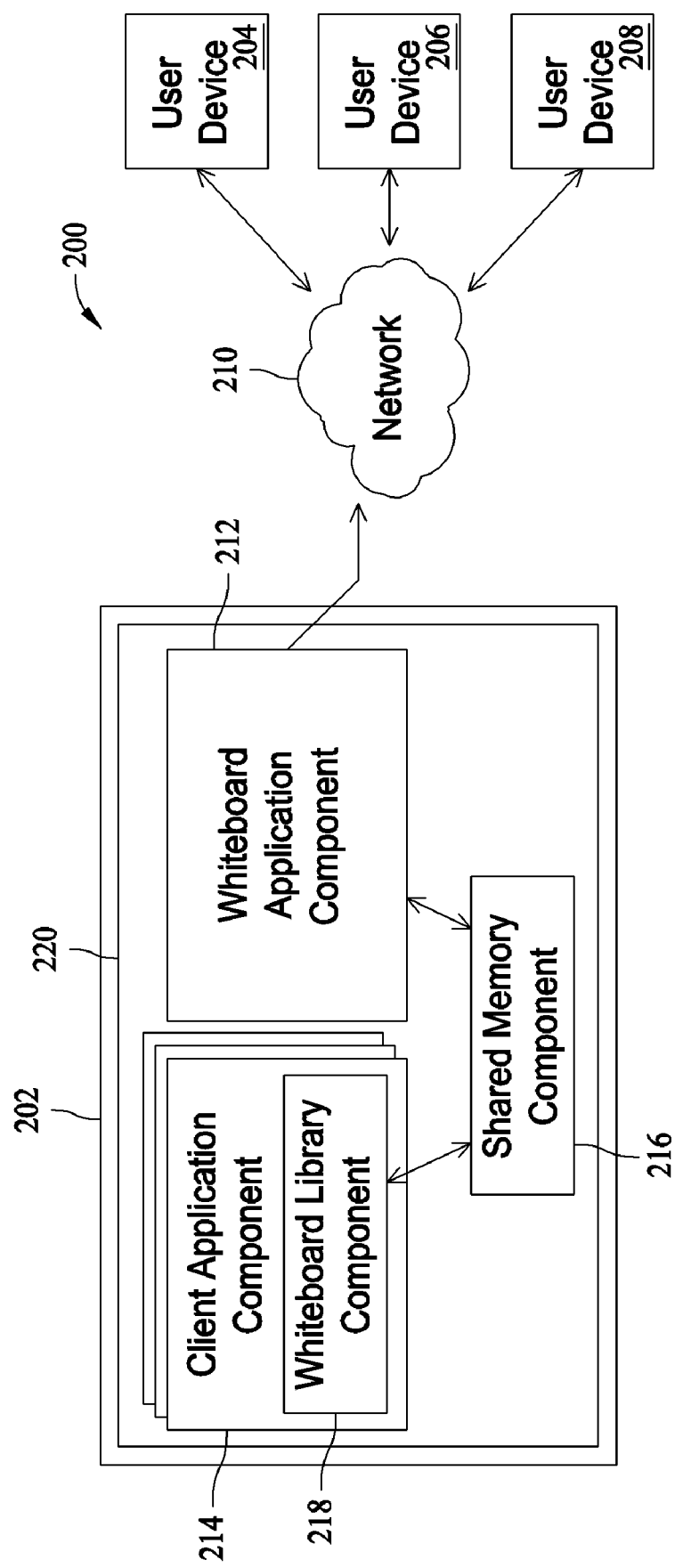
FIG. 2 is a block diagram of an exemplary system architecture suitable for use in implementing embodiments of the present disclosure.

Referring now to FIG. 2, a block diagram of an exemplary system architecture 200 for communicating whiteboard content between two or more users is shown. It will be understood and appreciated by those of ordinary skill in the art that the overall system architecture 200 shown in FIG. 2 is merely an example of one suitable computing environment and is not intended to suggest any limitation as to the scope of use or functionality of the present disclosure. Neither should the overall system architecture 200 be interpreted as having any dependency or requirement related to any single component or combination of components illustrated therein.

System 200 includes user devices 202, 204, 206, and 208 connected to a network 210. Each of the user devices 202, 204, 206, and 208 shown in FIG. 2 may be any type of computing device, such as computing device 100 described above with reference to FIG. 1. By way of example only and not limitation, the user devices 202, 204, 206, and 208 may be a personal computer, desktop computer, laptop computer, handheld device, consumer electronic device, and the like. It should be noted, however, that the present disclosure is not limited to implementation on such computing devices, but may be implemented on any of a variety of different types of computing devices within the scope of embodiments of the present disclosure.

With continuing reference to FIG. 2, the user device 202 includes a whiteboard collaboration system 220 for implementing embodiments of the present disclosure. In embodiments, the whiteboard collaboration system 220 includes a whiteboard application component 212, for example a software application, a client application component 214 (which includes a whiteboard library component 218), and a shared memory component 216 accessible by both the whiteboard application component 212 and the client application component 214. In embodiments, more than one client application component 212 (software application) may exist on the user device 202 or on any of the user devices 204, 206, 208. Further, while more than one client application component may exist on the user devices 202, 204, 206, and 208, each of the client application components include a common internal unit category, for example, a geographic unit category described in latitude and longitude. In embodiments, the shared memory component 216 communicatively couples the client application component 214 and the whiteboard application component 212. In further embodiments, other types of communication components, such as pipes, sockets, mailboxes, system messages, and the like may be used instead of, or in conjunction with the shared memory component 216. Although not shown in FIG. 2, similar to that of the user device 202, the user devices 204, 206, and 208 also include a whiteboard collaboration system that includes a client application component (which includes a whiteboard application component) and a shared memory component. In embodiments the user devices 204, 206, and 208 may also include a client application component. However, if a client application component is not included in the user devices 204, 206, and 208, the user devices 204, 206, and 208 will not be able to create and transmit annotations, but will still be able to receive annotations from the user 202. In embodiments, the components 212, 214, 216, and 218 may be integrated directly into an operating system for the user devices 202, 204, 206, and 208. It will be understood by those skilled in the art that the components 212, 214, 216, and 218 illustrated in FIG. 2 are exemplary in nature and in number and should not be construed as limiting. Any number of components may be employed to achieve the desired functionality within the scope of embodiments of the present disclosure. Similarly, any number of user devices may be used.

With current whiteboard applications, annotations are created and drawn into a whiteboard application that is separate from a client application. That is, the annotations are drawn only in the whiteboard application and do not appear in the client application. Thus, there is no interaction between the client application and the whiteboard application, and therefore, the annotations created by a user do not relate to the client application. However, including a simple and unobtrusive software library (discussed in further detail below), for example the whiteboard library component 218, that can be embedded within the client application component 214 of the user device 202 or in multiple user devices, such as the user devices 204, 206, and 208, allows whiteboard application annotations to be created and drawn directly within the client application component 214.

As mentioned above, the whiteboard library component 218 is a software library that may be compiled and linked into the client application component 214. In embodiments, the whiteboard library component 218 is then shared between both the whiteboard application component 212 and the client application component 214, which allows whiteboard application annotations to be created and drawn directly within the client application component 214. Below is an illustrative example of one way to embed a software library, for example whiteboard library component 218, into the client application component 214. One of ordinary skill in the art will appreciate that the method (below) for embedding the software library into the client application component 214 is only exemplary and other methods for embedding the software library into the client application component 214 are within the scope of the present disclosure. A software developer may embed the software library into the client application component 214 by (pre-supposing by way of example, a C++ Windows application):

1) Adding #include "WhiteboardShared.h" to a header file of a dialog or view class to be annotated;
2) Adding WB_DECLARE to a private section of the dialog or view class;
3) Adding WB_INIT(<className>) to an initialization method of the dialog or view class, where <className> is a name of the dialog or view class to be annotated;
4) Adding WB_ANNOTATION_START(<ptType>) to a beginning of the dialog or view class's message handler for left-mouse-button-down events. In embodiments, <ptType> is an integer value designating a type of points that are appropriate to a particular dialog or view. For example, in an embodiment, three point types: WB_POINT_SCREEN=0, WB_POINT_METERS=1, and WB_POINT_LATLON=2 are defined. These three point types correspond to three different translations between screen points and logical points within a context of the dialog or view. However, a developer is free to define new unique values for <pointType> that designate some other type of screen-to-logical-unit translation (that is, translating display coordinates related to an annotation made in a client application, for example the client application component 214, into units that are application specific coordinates) and more could be added to the library as well;
5) Adding WB_MOUSE_MOVE(<point>, <ptType>) to the beginning of the dialog or view class's message handler for mouse movement events. Here <point> is a structure (usually passed with a mouse movement message) indicating a current screen position of a mouse, and <ptType> is the same value passed with WB_ANNOTATION_START;

6) Adding WB_ANNOTATION_END(<point>, <ptType>) to the beginning of the dialog or view class's message handler for left-mouse-button-up events. Here, <point> is a structure (usually passed with the mouse button up message) indicating a current screen position of the mouse, and <ptType> is a same value passed with WB_ANNOTATION_START;
7) Adding WB_DRAW_ALL(<dc>, <ptType>, <className>) or WB_DRAW_OGL_ALL(<ptType>, <className>) to a main drawing method of the dialog or view class. Placement of this call may be chosen based on a desired drawing order of annotations relative to other entities drawn within the dialog or view. In embodiments, one may choose the second option only if an application uses OpenGL drawing, otherwise, one may choose the first option for Windows GDI drawing. Other drawing systems such as DirectX, GTK, wxWidgets, and the like, may be implemented within the whiteboard library and could be selected by a developer. In the current embodiment, <ptType> and <className> are as described in previous steps, and <dc> is a drawing device context (for Windows GDI drawing);
8) Adding a preprocessor definition for WB_USE_OPENGL to a Makefile or project file if the client application uses OpenGL. Otherwise, the application is assumed to use standard Windows GDI drawing;
9) Adding bodies for two new (automatically declared) member functions with the following names and signatures (C++ as in the current embodiment) in the source file of the dialog or view class:
   void LocalToClient(double x, double y, POINT*p) const; and
   void ClientToLocal(const POINT &p, double*x, double*y) const.
The first function is defined to convert given x and y values in logical units (for example, latitude and longitude) into a client screen coordinate structure p. The second function is defined to perform an opposite conversion from display coordinates p to logical units x and y, that is, units application specific coordinates. The POINT structure type in the function signatures matches the WB_MOUSE_MOVE and WB_ANNOTATION_END calls described in steps 5 and 6 above; and
10) Adding the WhiteboardShared library, for example the whiteboard library component 218, to a project and compiling and linking the WhiteboardShared library into an executable. In embodiments, the WhiteboardShared library contains a code for creating annotations of different kinds, keeping track of annotations that are created, and inter-process communication with the whiteboard application. In further embodiments, the WhiteboardShared library also contains definitions of macro functions described in the previous steps.

Including the whiteboard library component 218 within the client application component 214 allows for a more natural interaction between a user and the client application component 214. Further, it is also easier for the user to switch between a normal operation mode and an annotation mode. Furthermore, because annotations are drawn within the client application component 214, the annotations can be drawn in any order relative to other objects within the client application component 214. For example, the annotations may be below all other objects, above all other objects, or above some objects and below other objects. In embodiments, the whiteboard library component 218 may include any software code that provides instructions to the client application component 214 to create and draw annotations within and by the client application component 214. In embodiments, the whiteboard library component 218 may or may not be executable, and may or may not form multiple blocks of code. Embodiments disclosed herein are not limited to any particular programming language or style.

Figure 3:
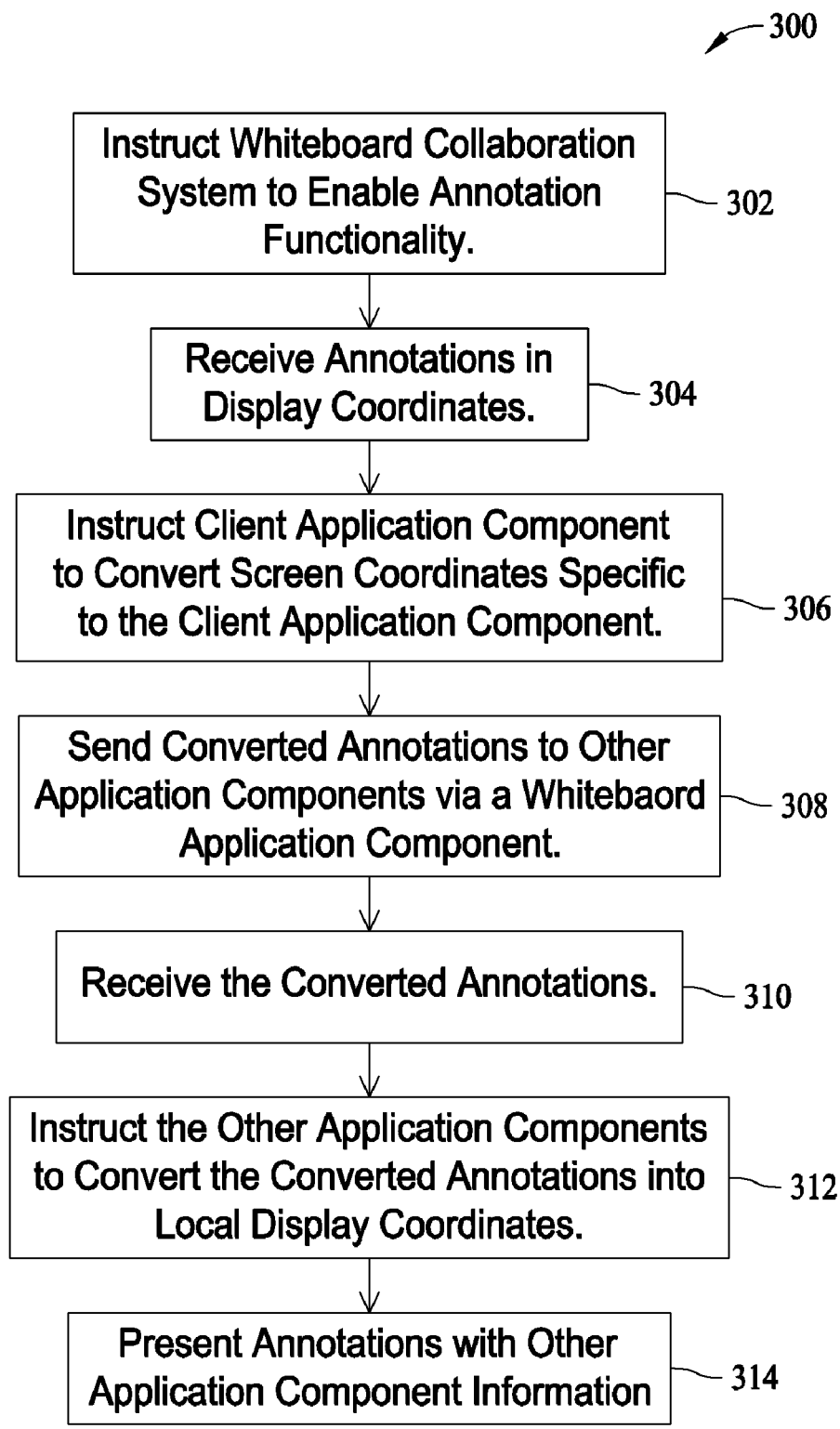
FIG. 3 is a flow diagram of an exemplary method for use in implementing embodiments of the present disclosure.

As mentioned above, the present disclosure is related to a communication of whiteboard content between two or more users at respective computer terminals included in a computer system. FIG. 3 is a flow diagram 300 that illustrates an exemplary method for implementing a communication of whiteboard content between two or more users. Referring specifically to FIG. 3, once a user indicates to the whiteboard collaboration system 220 via user interface 400 (discussed below) to enable an annotation functionality within the client application component 214, the whiteboard collaboration system 220 is instructed 302 to enable annotation functionality. In embodiments, once the annotation functionality is instructed 302 to enable annotation functionality, the whiteboard application component 212 automatically joins a predefined multicast group. In embodiments, the multicast group is defined and joined using instructions in the whiteboard library component 218. Any component on any of the user devices that links with and properly initializes the whiteboard library component 218 is automatically made a member of a multicast group and receives transmissions directed to that group. Therefore, joining a multicast group happens at initialization, and is unrelated to turning on annotation functionality. Client application components on other user devices, for example the user devices 204, 206, and 208, on the network 210 that may or may not have a whiteboard application component running may still join the group and receive and display annotations created by other users.

Figure 4:
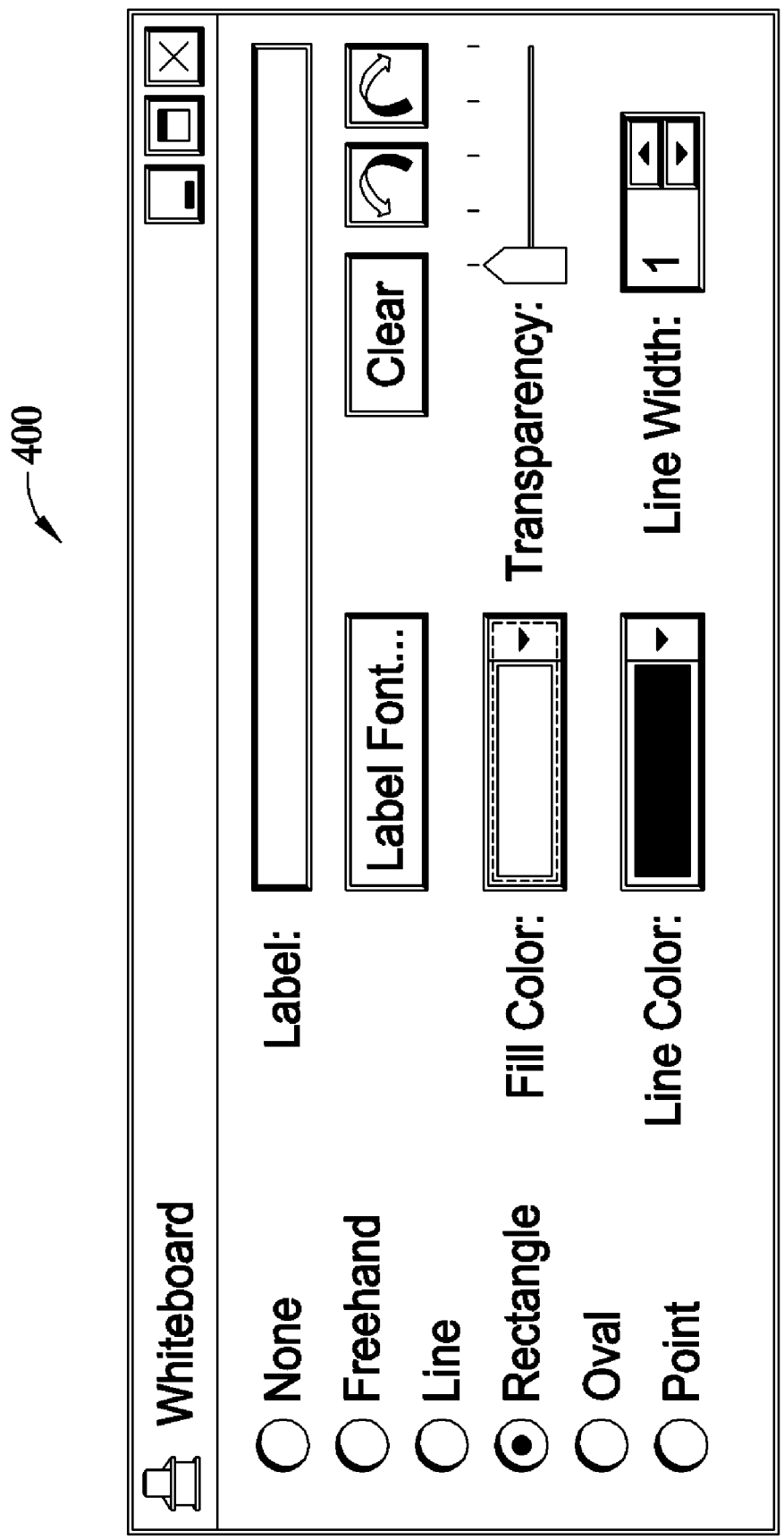
FIG. 4 is a screen display of an exemplary user interface for use in implementing embodiments of the present disclosure.

In embodiments, the whiteboard application component 212 is responsible for presenting a user interface associated with enabling and disabling the annotation functionality. For example, referring now to FIG. 4, an illustrative example of a user interface (user interface 400) associated with the whiteboard application component 212 is shown. In embodiments, the user interface 400 is configured to allow a user to turn an annotation on and off, as well as select a particular annotation type, property and action to be taken, for example selecting various drawing tools (for example, point, line, rectangle, freehand, and the like), as well as for example, a color, line width, label text, font, edit, undo last, redo last, clear all and the like. One of ordinary skill in the art will appreciate that the user interface 400 is illustrative in nature and may be more simple or more complex in various embodiments.

Referring back to FIG. 3, annotations created and drawn by a user are received 304 as display coordinates, for example pixels, by the client application component 214 in the user device 202. The client application component 214 is instructed 306 to convert the annotations created and drawn by a user from user specified display coordinates, for example pixels, into application specific coordinates, for example, logical units in latitude and longitude. Therefore, the annotations become nothing more than additional objects to be drawn by the client application component 214 using a same coordinate system in which it draws all other objects. For example, client application components within the user device 202 and the user device 204 are able to communicate annotations and are able to do so merely by virtue of having been built to interpret annotation units of a certain common type, for example logical units in latitude and longitude. Therefore, the annotation units are transmitted with each annotation and the client application components within, for example the user device 202 and the user device 204, will respond to annotations that are in units that they understand, that is, they will respond to their own application specific coordinates, such as latitude and longitude. One advantage of the above method is that each client application component within system 200 receives the annotations created in the client application component 214 without a need to be the same client application that is within the client application component 214. That is, because the annotations are converted into application specific coordinates utilized at that same user device or various user devices, for example the user device 204, the different client application components can interpret the positions of the converted annotations.

With continuing reference to FIG. 3, the whiteboard application component 212 sends 308 the annotations to the different client application components running at the various user devices. One advantage of sending only the annotations to the different client application components, as opposed to sending the annotations within a screen shot, is that network bandwidth usage is minimized since only data relating to the annotations is transmitted. Further, because only the annotations are transmitted, security is enhanced because classified or restricted data, such as maps and images are not transferred with the annotations. The different client application components receive 310 the annotations in application specific coordinates, for example, in logical units such as latitude and longitude. In embodiments, in order for the different client application components to accurately display the annotations, the annotations need to be converted into local display coordinates. Thus, the different client application components are instructed 312 to convert the annotations from, for example, application specific coordinates (latitude/longitude) into local display coordinates (pixels).

Various user devices, such as the user devices 204, 206, and 208 that receive and display the annotations may have display windows that are different sizes and display windows that are in different positions than that of a user creating and drawing the annotations. Therefore, an additional benefit of converting the annotations created and drawn by the user from display coordinates into application specific coordinates is that a user does not have to be looking at a same portion of a client application, for example a map, as the user who created the annotations in order to be presented accurate annotations or be aware of the fact that the annotations have been received. Thus, the different client applications may be arranged and sized on a screen in any desired manner without regard to a position of an annotated area and the annotations will automatically be placed in a correct position based off of the applications specific coordinates, for example, the logical units received that are thereafter converted into local display coordinates by the different client application components. In embodiments, a text or a symbol, such as an arrow, may be presented to a user on the user's screen indicating that an annotation has been received but is not currently shown on the screen. One of ordinary skill in the art will appreciate that other symbols and or methods of alerting a user that an annotation has been received are within the scope of the present disclosure.

Referring back to FIG. 3, the user devices 204, 206, and 208 present 314 the annotations created and drawn by the user device 202. A presentation component (not shown) of the user devices 202, 204, 206, and 208 is configured to present the annotations. Typically, the presentation of the annotations comprises displaying the annotations on a display device associated with the user devices 202, 204, 206, and 208. However, other types of presentation, such as an audible presentation, may also be provided within the scope of embodiments of the present disclosure.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for conducting a collaborative web-based whiteboard session, comprising:
   receiving one or more annotations in first units, the one or more annotations being made within a first client application component;
   converting the one or more annotations from the first units into second units by utilizing a software component associated with the first client application component;
   sending, by a white board application that is separate from the first client application, the one or more annotations, in the second units, to a second client application component;
   converting the one or more annotations received from the first client application component from the second units into coordinates specific to the second client application component; and
   presenting the one or more annotations using the coordinates specific to the second client application component to a user through the second client application component.

2. The method according to claim 1, further comprising sending an annotation type, action and/or property from the first client application component to the second client application component.

3. The method according to claim 2, wherein the annotation type, action, and/or property is one of a point, line, rectangle, freehand, color, line width, label text, font, edit, undo last, redo last, and clear all.

4. The method according to claim 1, wherein the first units are display coordinates.

5. The method according to claim 1, wherein the second units are logical units.

6. The method according to claim 5, wherein the logical units are latitude and longitude.

7. A system for conducting a collaborative web-based whiteboard session, the system comprising a first computer capable of communicating with other computers on a network:
   the first computer comprising:
      a first user interface;
      a first client application component running thereon, the first client application component operable to receive one or more annotations via the first user interface, wherein the one or more annotations are in first units, and wherein the first client application component is operable to convert the one or more annotations into second units; and
      a whiteboard application component that is separate from the first client application component, the whiteboard application component operable to send the one or more converted annotations to a second client application component, the second client application component operable to convert the one or more annotations received, from the second units into coordinates specific to the second client application component, the second client application component operable to present the one or more annotations using the coordinates specific to the second client application component to a user through the second client application component.

8. The system according to claim 7, wherein the first units are display coordinates.

9. The system according to claim 8, wherein the display coordinates are pixels.

10. The system according to claim 7, wherein the second units are logical units.

11. The system according to claim 10, wherein the logical units are latitude and longitude.

12. The system according to claim 7, wherein the first computer further comprises a first shared memory component operable to allow communication between the first client application component and the first whiteboard application.

13. The system according to claim 12, wherein the shared memory component is one of a pipe, socket, mailbox or system message.

14. The system according to claim 7, further comprising a second computer device comprising:
   a second user interface; and
   a second whiteboard application component associated with the second client application component operable to receive the one or more converted annotations.

15. The system according to claim 14, further comprising a second shared memory component operable to allow communication between the second client application component and the second whiteboard application associated with the second client application component.

16. The system according to claim 15, wherein the second shared memory component is one of a pipe, socket, mailbox or system message.

17. One or more non-transitory computer readable media comprising computer-readable instructions thereon that instruct one or more processors to perform steps comprising:
   receiving one or more annotations in first units, the one or more annotations being made within a first client application component;
   converting the one or more annotations from the first units into second units by utilizing a software component associated with the first client application component;
   sending, by a white board application that is separate from the first client application component, the one or more annotations in the second units, to a second client application component;
   converting the one or more annotations received from the first client application component from the second units into coordinates specific to the second client application component; and
   presenting the one or more annotations using the coordinates specific to the second client application component to a user through the second client application component.

* * * * *